Jan. 13, 1948.   A. M. CHAMBERS, JR   2,434,485
OIL SEAL
Filed June 19, 1945

INVENTOR
ALBERT M. CHAMBERS JR.
BY
Fraser, Myers & Manley
ATTORNEYS

Patented Jan. 13, 1948

2,434,485

UNITED STATES PATENT OFFICE 2,434,485

OIL SEAL

Albert M. Chambers, Jr., Palmyra, N. Y., assignor to The Garlock Packing Company, Palmyra, N. Y., a corporation of New York Application June 19, 1945, Serial No. 600,273

9 Claims. (Cl. 288—3)

The present invention relates to improvements in seals adapted to prevent the passage of oil or other fluid, or of dust or other foreign matter along an annular space between a pair of machine elements which are movable relatively to each other, such as, for example, a rotatable shaft and a stationary housing in which the shaft is mounted. The invention is particularly directed to such seals employing a garter spring associated with a sealing lip of a flexible or pliant sealing element for urging and holding the sealing lip firmly in sealing engagement with one of the two machine elements.

Perhaps the most common use of oil seals is in structures wherein the housing is stationary, and the shaft rotates, hence, this type of structure is referred to herein to illustrate the principles of this invention. Oil seals employing a garter spring commonly have a sealing ring which encircles the shaft. The sealing ring has an outer portion in fixed sealing relation to the stationary housing and a somewhat conical flexible sleeve or sealing flange extending along the shaft and converging to a sealing lip having a wiping, sealing engagement with the shaft. The sealing lip, usually, is thickened somewhat to render it more durable. The garter spring contracts upon the sealing lip to hold the latter firmly in sealing engagement with the shaft. For best results, the force of the garter spring should be applied to the edge or tip of the sealing lip, and, for that reason, the garter spring is usually located as close as possible to that edge.

Some oil seals, however, must function in machines wherein the shaft may become substantially misaligned relatively to the housing and yet continue to function acceptably. Perhaps the best example of this is a structure such as disclosed in my co-pending application, Serial No. 577,113, filed February 9, 1945, wherein the shaft is of very substantial diameter, say 30 inches more or less, while the annular space or clearance between that shaft and its housing is relatively small, say about 1 inch. In such a structure, misalignment of as much as ¼ inch might be tolerated.

To allow for such misaligned condition of the structure, the greater spring may have to be disposed somewhat inwardly on the sealing flange instead of at the very edge of the sealing lip in order to provide room in the oil seal for the very substantial outward flexing of the sealing flange at one side of the shaft. This poses the problem of maintaining the application of the force of the spring upon the edge of the sealing lip; and one important object of this invention is the provision of means for holding the garter spring at a distance from said edge while nevertheless maintaining the spring pressure upon that edge.

Such conditions of misalignment, also, cause the sealing flange to diverge from rather than to converge to the shaft, at one side of the latter, although the sealing lip of the flange continues in sealing engagement with the shaft. As the contractile force of the garter spring causes it to seek its smallest overall circumference and diameter, the mentioned divergence permits the spring, at one side of the shaft, to shift further away from the edge of the sealing lip, thus impairing the effectiveness of the latter's sealing engagement with the shaft. It is another important object of this invention to provide means for limiting the shifting of the spring away from the edge of the sealing lip.

My said co-pending application discloses improved means for limiting the shifting of the garter spring toward the edge of the sealing lip and thus for preventing said spring from becoming separated from the oil seal assembly, even when the sealing element of the latter is fully contracted, as before the oil seal is installed in a machine. Another object of the present invention is the provision of such shift-limiting means in conjunction with means for accomplishing the several other objectives recited herein.

The foregoing and other objects of this invention, apparent from the following specification and the accompanying drawing, are accomplished, according to the present invention, by providing an annular spring-carrier of flat, pliant or flexible, relatively hard material, extending about the exterior of the sealing flange, and having portions extending between the garter spring and the sealing flange to serve as a bearing surface for the latter, other portions extending to the edge of the sealing lip, to communicate the tension of the garter spring to that edge, and prongs forming an annular channel for the garter spring, limiting the shifting of the latter either toward or away from the edge of the sealing lip.

This invention may be embodied in a variety of structures but the several embodiments shown in the accompanying drawing should afford a basis for a complete understanding of the invention. These disclosed embodiments are merely illustrative and it should be clearly understood that the present invention is not limited to these particular structures.

In the drawing:

Figure 1 is an axial sectional view of an oil seal (hereinafter referred to as the "first embodiment") according to the present invention, the seal being mounted in an annular space between an outer machine element or housing and a shaft extending therewithin. The section corresponds to the line 1—1 of Fig. 3 and the shaft is broken away axially to indicate that the diameter of the shaft relatively to the sectional diameter of the oil seal may be substantially greater than illustrated.

Figure 4:
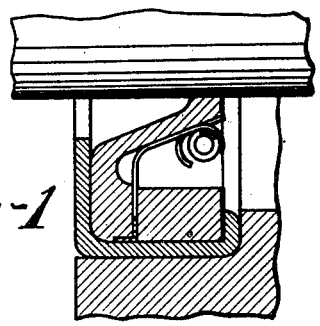
Figure 5:
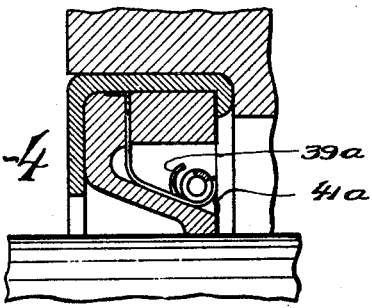

Figs. 4 and 5 respectively are sectional and fragmentary perspective views illustrating a further (second) embodiment of the invention.

Figure 6:
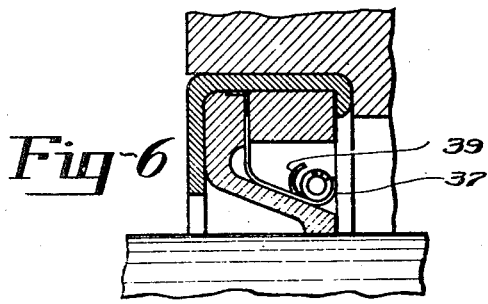

Fig. 6 is a sectional view illustrating still another (third) of many possible embodiments of the invention.

Figure 1:
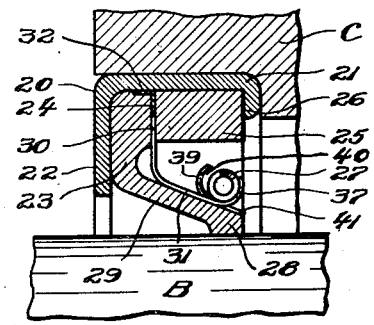
Figure 2:
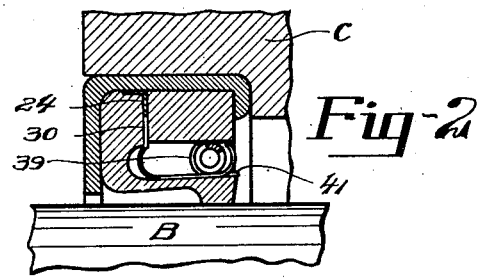
Fig. 2 is a sectional view corresponding to the upper portion of Fig. 1, illustrating the condition of the various parts of the oil seal of the first embodiment, at one side of the shaft when the shaft is very substantially misaligned.
Figure 3:
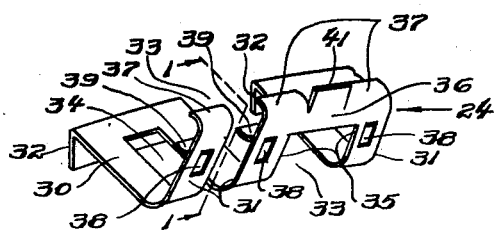
Fig. 3 is a fragmentary perspective view of a portion of a spring-carrier included in Fig. 1.

In the first embodiment, illustrated in Figs. 1-3, the oil seal comprises a rigid annular shell 20 preferably of suitable metal having a peripheral cylindrical portion 21 adapted to be oil-tightly fitted into the housing C, and a radial flange 22 extending inwardly from one side of the cylindrical portion 21 and terminating at a distance from the shaft B. Within the shell 20 are arranged, as shown, an annular flexible sealing element 23, an annular pliant or flexible spring-carrier 24 and a retaining ring 25, all firmly held within the shell by an inturned annular lip 26 formed along the free edge of the cylindrical portion 21 of the shell.

A contractile, garter-type coil-spring 27 extends about the outer side of a sealing lip 28 formed adjacent the free edge of an annular sealing flange 29 of the sealing element 23. The sealing element, and particularly the flange 29 and the sealing lip 28 thereof, ordinarily is of relatively flexible or pliant material such as leather or rubber, or other material suitable for sealing purposes. The garter spring 27 is adapted to hold the sealing lip 28 in firm sealing contact with the shaft B, but in preference to having the said spring in direct contact with the sealing lip, under which condition it might wear into and have a snubbing effect with respect to the latter, the spring-carrier 24 has portions extending between the mentioned spring and the sealing lip, so that the spring-carrier affords a bearing surface for the spring, thus avoiding any wear upon the outer side of the sealing lip and avoiding any possible snubbing effect.

The spring-carrier 24 is preferably formed from flat, relatively hard and pliant or flexible material, such as a suitable metal. It has an anchor portion in the form of a flange 30 which may extend radially and be firmly gripped between the sealing element 23 and the retaining ring 25, and an axially extending flange 31 which, advantageously, may lie in intimate face to face engagement with the outer face of the sealing flange 29.

As best seen in Fig. 3, the spring-carrier 24 also has a sectionalized annular peripheral flange 32, the plural similar sections of which are separated by gaps 33 extending through both the flanges 30, 32 and substantially into or partially through flange 31. Slots 34, located at regular intervals about the carrier 24 in the flange 31 and extending partially into the flange 30, subdivide the flange 31 circumferentially into a series of paired fingers 35, 35, the free ends of which are interconnected by webs 36. The gaps 33 and the slots 34 render the spring-carrier 24 readily conformable, circumferentially, with the other parts of the oil seal so that it may fit into place easily in the assembling of the device.

The ends of the fingers 35, 35 are rolled or bent outwardly to form outer prongs 37 and intermediate portions of said fingers are partially cut away as at 38 and rolled or bent upwardly to form inner prongs 39. The prongs 37 and 39 constitute the outer portions and inner portions, respectively, of an annular channel 40 within which the garter spring 27 is disposed.

From Fig. 1, it may be seen that when the shaft B is in substantial alignment with the casing C, the spring-carrier 24 converges from its radial flange 30 toward said shaft, and the prongs 37 limit the shifting of the garter spring 27 toward the right. From Fig. 2, it may be seen that when the shaft B is substantially out of alignment, the spring-carrier 24 diverges from its radial flange 30, away from the shaft, and the prongs 39 limit the shifting of the garter spring toward the left. Although the prongs 37, 39 are shown on all fingers 35 which are visible in the drawing, it might be feasible, in some oil seal structures, to provide such prongs on less than all said fingers but in sufficient number and so distributed around the spring-carrier as to serve the purposes of this invention.

From Fig. 3 it may also be observed that the web 36 is cut toward each side thereof so that when the prongs 37 are bent to their desired form, a tab 41 remains unbent and serves as a continuation of the flange 31 to the free edge of the sealing lip 28. Although the material of which the spring-carrier 24 is made may be somewhat pliant it should be stiff enough to enable the tab 41 substantially to communicate the contractile force of the garter spring to the free edge of the sealing lip.

As suggested, the spring-carrier 24 may be of pliant material or of resilient or flexible spring material. If of spring material, the spring-carrier, in addition to its functions hereinbefore described, may function as a flat spring either opposing or supplementing the force of the garter spring. If the spring-carrier is of pliant, rather than spring material, the spring-carrier, of course, does not materially modify the contractile force imposed upon the sealing lip.

The second embodiment, illustrated in Figs. 4 and 5, differs from the first embodiment principally in that instead of the unbent tab 41, a bent tab 41a is provided by bending it inwardly as best seen in Fig. 4, so that the outer edge of the tab communicates the force of the garter spring to the free edge of the sealing lip and localizes that force upon that edge. In this embodiment, also, the inner prongs 39a are bent inwardly from the inner limit of the web 36, instead of being formed of material cut away from the fingers 35.

The third embodiment, illustrated in Fig. 6, differs from the other illustrated embodiments in having no tab equivalent to the tabs 41 and 41a. In this embodiment, the prongs 37 and 39 may be formed as in the other two illustrated embodiments or in some other suitable equivalent manner.

Although the invention has been described herein as having the oil seal fixed in the housing and in wiping sealing contact with the shaft, it may also be practiced in an oil seal which is fixed up on the shaft and is in wiping sealing contact with a surface of the housing. In the latter arrangement, the garter spring, instead of exerting a contractile force upon the sealing lip, ordinarily exerts an expansive force thereupon.

It may be seen, from the foregoing, that the present invention constitutes simple, inexpensive and effective means for holding a garter spring against material shifting in either direction axially within an oil seal and also provides means for communicating the force of a garter spring to the free edge of the sealing lip of a sealing element.

Consideration of the several illustrated embodiments, also, should make it clear that the present inventive concept may be practiced in many different structural arrangements without, however, departing from the invention as defined in the following claims.

What I claim is:

1. A device adapted to seal an annular space between two relatively movable machine elements, comprising an annular sealing element adapted for disposition in said space and having a first sealing portion adapted for disposition in sealing relation to a first of the machine elements, and a flexible sealing flange having a sealing lip adapted to engage a second of said machine elements in sealing relation thereto; a garter spring supported by said flange in a predetermined position relatively thereto and adapted to urge said sealing lip into such sealing relation to the second machine element, but tending, in some positions to which said sealing flange may flex, to shift from said predetermined position; and a separate spring retainer for substantially preventing such shifting, said spring retainer being restrained against material axial movement relatively to said sealing flange, and having pivotal fingers disposed adjacent the said garter spring and adapted to pivot with the flexing of said sealing flange, a plurality of said fingers having prongs bent to extend to positions at the side of the garter spring nearest the free edge of the sealing flange substantially to prevent such shifting of the said spring toward said free edge, and a plurality of said fingers having prongs bent to extend to positions at the side of the garter spring farthest from the free edge of the sealing flange substantially to prevent such shifting of the said spring away from said free edge.

2. A device according to claim 1, the said spring retainer fingers extending between the sealing flange and the garter spring, and the said spring retainer, further, having an anchor portion, fixed against movement relatively to the first sealing portion of the sealing element, and a resilient portion, connecting the said fingers to the said anchor portion, and adapting said fingers to modify the spring pressure applied to the sealing flange.

3. A device according to claim 1, the said prongs being arcuate and having their concave sides facing the garter spring.

4. A device according to claim 1, the said prongs being arcuate and having their concave sides facing the garter spring, and the prongs at opposite sides of said spring being axially spaced to an extent greater than the sectional diameter of the spring whereby to permit easy insertion of said spring in assembling the device.

5. A device adapted to seal an annular space between a housing and a rotatable shaft extending into an opening in said housing, comprising a sealing ring adapted for disposition in said space and having a portion adapted for disposition in substantially fixed sealing relation to said housing, and an angularly flexible flange having an annular portion encircling and adapted to engage said shaft in sealing relation thereto; a garter spring encircling said flange in a predetermined position relatively thereto and adapted to constrict the latter into its sealing relation to the shaft, but tending in some angular positions of said flange, to shift axially from said predetermined position; and an annular spring retainer for substantially preventing such shifting, said spring retainer being restrained against material axial movement relatively to said flange, and having circumferentially arranged, axially extending pivotal fingers exteriorly of said flange and within said garter spring, a plurality of said fingers having outwardly bent prongs at one side of the garter spring substantially to prevent such shifting of the latter axially in one direction relatively to the said flange, and a plurality of said fingers having prongs partially cut from said fingers and bent outwardly at the opposite side of the garter spring substantially to prevent such shifting of the latter axially in the opposite direction relatively to the said flange.

6. A device adapted to seal an annular space between two relatively movable machine elements, comprising an annular sealing element adapted for disposition in said space and having a portion adapted for disposition in sealing relation to a first of the machine elements, and a flexible sealing flange having a marginal sealing lip at its free edge adapted to engage a second of said machine elements in sealing relation thereto; a garter spring supported by said flange at an axial point thereon removed from the free edge thereof and adapted to urge said sealing lip into such sealing relation to the second machine element but tending, in some positions to which said sealing flange may flex, to shift axially from said axial point; and a separate spring retainer for substantially preventing such shifting, said spring retainer being restrained against material axial movement relatively to said sealing flange, having pivotal finger portions extending between the garter spring and the sealing flange, a plurality of the said finger portions having prongs partially cut from and bent from said finger portions at axially spaced points removed from the free edge thereof and at opposite sides of said garter spring for preventing material shifting of the latter in either axial direction, and a plurality of said finger portions having spring-force-communicating portions extending substantially from adjacent said garter spring into engagement with the exterior of said sealing flange at the free edge thereof and adapted to communicate the force of the garter spring to said free edge.

7. A device according to claim 6, the said spring-force-communicating portions being of relatively stiff material and substantially rigidly connected to adjoining parts of their related finger portions whereby to enhance their capacity to communicate the force of the spring to the free edge of the sealing flange.

8. A device according to claim 6, the said spring-force-communicating portions extending axially in intimate contact with the outer surface of the sealing flange from a point thereon adjacent the garter spring to the free edge of the said flange.

9. A device according to claim 6, the said spring-force-communicating portions being in the form of arches extending axially from said spring-guiding means into localized engagement with the outer side of the sealing flange at the free edge thereof.

ALBERT M. CHAMBERS, JR.

REFERENCES CITED

The following references are of record in the file of this patent:

UNITED STATES PATENTS

| Number | Name | Date |
| --- | --- | --- |
| 2,076,747 | Salisbury | Apr. 17, 1937 |
| 2,255,613 | Fisher et al. | Sept. 9, 1941 |

FOREIGN PATENTS

| Number | Country | Date |
| --- | --- | --- |
| 646,139 | Germany | June 8, 1941 |